(No Model.)

G. W. SMITH.
INTERLOCKING JOURNAL BEARING.

No. 309,891. Patented Dec. 30, 1884.

Witnesses:
William Dmashey
Henry A. Lacey

Inventor:
Geo. W. Smith
La Fayette
Ind.

UNITED STATES PATENT OFFICE.

GEORGE W. SMITH, OF LAFAYETTE, INDIANA.

INTERLOCKING JOURNAL-BEARING.

SPECIFICATION forming part of Letters Patent No. 309,891, dated December 30, 1884.

Application filed November 27, 1883. (No model.)

*To all whom it may concern:*

Be it known that I, GEORGE W. SMITH, of Lafayette, in the county of Tippecanoe, State of Indiana, have invented a new and improved article of manufacture relating to cars or conveyances, such, for example, as steam railway and street cars, of which the following is a specification.

The objects of my invention and improvements are to provide a durable and inexpensive two-part interlocking journal-bearing, which can be used in the journal-boxes now in common use upon trucks, cars, and the like, the wedge or key whereof is constructed of metal and the bearing part of wood, pulp, asbestus, leatherine, or other fibrous matter, either with or without a lining of metal or compressed matter, as the service to be performed may require.

The nature of my invention consists in the combination of metal or wood, pulp, leatherine, or fibrous matter in a peculiar manner, hereinafter described, forming an interlocking two-part journal-bearing by means of fitting shoulders or corrugated surfaces holding the parts together as against end motion, either with or without a lining of metal, pulp, leatherine, leather-board, or fibrous matter, as the service to be performed may require, of such size and shape as to outer contiguity as may be necesssary to operate in journal-boxes now in use on cars, trucks, and the like.

To enable others skilled in the art to make and use my invention, I will proceed to describe it. I construct my journal-bearing of size and shape necessary for service in ordinary journal-boxes on cars, trucks, and the like, of two parts interlocking each other, with the addition of a suitable lining, where the service to be performed requires it, the wedge or key whereof is provided with distended inclosing wings or supports and abutting shoulders or corrugated interlocking surfaces, whereby the bearing part thereof is supported or strengthened laterally and prevented from end motion upon its fellow.

Figure 1:
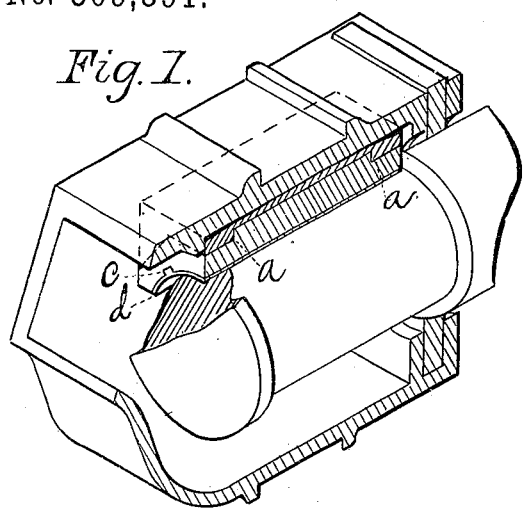
Figure 2:
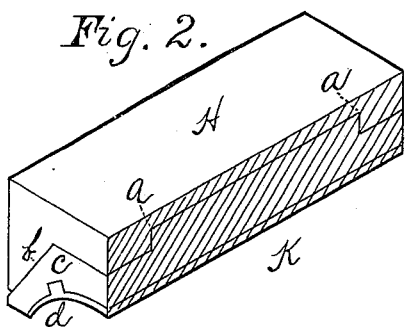

Referring to the drawings, Figure 1 is an isometric view of a section of a master car-builder's standard journal-box, which I use only to illustrate one method of applying my invention to journal-boxes now in use, and a journal with the end and flange broken off to show the position of my wedge or key and bearing, as Fig. 2, in act of use.

Fig. 2 is a section of the wedge or key, showing the interlocking shoulders *a a* on the wedge or key H, and bearing part K; also the the distended inclosing-wings *b* of the metal wedge or key H, which are designed to support and protect the bearing part K, made of wood, pulp, leatherine, leather-board, or compressed fibrous matter.

Figure 3:
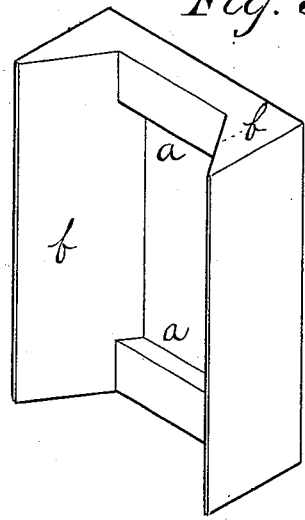
Figures 4, 5:
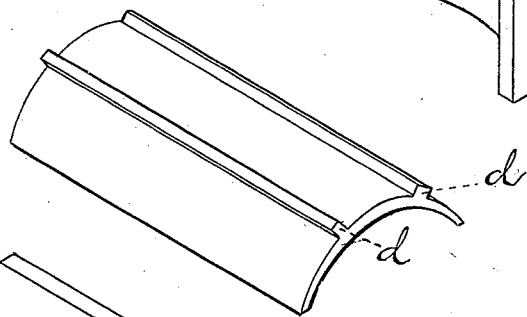
Figure 6:
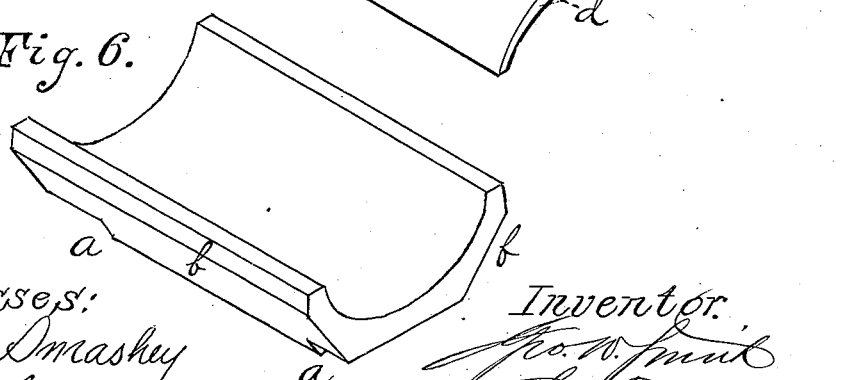

Fig. 3 is a drawing of the metal wedge or key, which I make of cast or malleable iron, the shoulders *a a* being designed to fit a bearing part, Figs. 4 or 6, constructed of wood, pulp, leatherine, leather-board, or fibrous matter, with corresponding shoulders to fit and hold the interlocking bearing against end motion in both directions, which I also accomplish of the same materials by corrugated surfaces to fit different-shaped journal-boxes, while the distended inclosing wings or flanges *b b* protect the sides of the bearing part against lateral motion and from splitting or breaking.

Fig. 4 represents the bearing part composed of wood, compressed pulp, leatherine, leather-board, or fibrous matter, as the service to be performed may require, with shoulders or their equivalent, with corrugated surfaces made to fit or compressed into a wedge or key, Fig. 3, having similar interlocking or corrugated surfaces to hold the bearing together against end motion in both directions. The grooves C C are only for the purpose of receiving and holding the lining *d d*, Fig. 5, on the face of the wood bearing against pressure when in act of use.

When the bearing composed as above is used without a lining, the grooves are not made in the bearing-surface, as in Fig. 6.

Fig. 5 represents a lining, which I make of suitable metal, or of leatherine, leather-board, or compressed fibrous matter, as the service to be performed may require, on a bearing of wood, &c., as Fig. 4, or its equivalent, for journals of cars, trucks, and the like. I make the lining for the bearing to fit the journal in box, illustrated Fig. 1, of shape to insert or slide the projections *d d* of the lining into the grooves C C, Fig. 4, for renewals of worn-out linings, without withdrawing the wedge or key, Fig. 3, or the bearing, Fig. 4, from their place in the box, the bearing being held up by the usual tools for withdrawing them from the box for renewal. The most important service for which the projections $d\ d$ and grooves C C, Fig. 4, are designed is to hold the lining in place in act of use on the journal and on the wood or compressed fibrous bearing, Fig. 4. This may be accomplished in a variety of ways by depressions on one and corresponding projections on the other, especially when the lining is compressed on the bearing, Fig. 4.

Fig. 6 is a drawing of my bearing part, made of wood, pulp, leatherine, leather-board, or fibrous matter, with interlocking shoulders $a\ a$, with sloping sides $b\ b$, designed to fit into the wedge or key of metal, Fig. 3, having interlocking shoulders to hold the bearing part against end motion in both directions, $a\ a$, and distended inclosing-wings $b\ b$, to protect the sides of the bearing part.

When I use leatherine, leather-board, or fibrous matter, I compress it into or cut it, or cut wood in shape to fit, Fig. 3, or its equivalent, with shoulders or corrugated surfaces interlocking for different journal-boxes, preserving the form necessary to hold it against end motion in both directions, as well as lateral motion. The bearing is readily placed in position in the same manner as other journal-bearings, commonly called "brasses."

I believe the combination of metal and wood, leatherine, leather-board, or fibrous matter, either with or without the lining, in the form and shape, with distended inclosing-wings, and shoulders or corrugated surfaces interlocking, as described, for use in boxes as ordinarily constructed for journal-bearings of cars, trucks, and the like, is new as well as useful; therefore,

What I claim as my invention, and desire to secure by Letters Patent of the United States, is—

1. As a new article of manufacture, a two-part journal-bearing for cars, trucks, and the like, consisting of a wedge or key and a journal-bearing portion, the former constructed of a different material from the latter, and each with a surface designed to interlock with the other, so as to prevent endwise movement of either part upon the other, and distended inclosing-wings protecting against lateral motion.

2. As a new article of manufacture, a two-part journal-bearing for cars, trucks, and the like, consisting of a wedge or key and a journal-bearing portion, each with a surface designed to interlock with the other, the latter of which is constructed of wood and lined with fibrous matter.

3. As a new article of manufacture, a two-part journal-bearing for cars, trucks, and the like, consisting of a wedge or key and a journal-bearing portion, each with a surface designed to interlock with the other, the latter of which is constructed of wood, leatherine, leather-board, or fibrous matter, and lined with a metallic substance.

4. As a new article of manufacture, a two-part journal-bearing for cars, trucks, and the like, consisting of a wedge or key and a journal-bearing portion, each constructed with a surface designed to interlock with the other, and one of said parts—the bearing—composed of fibrous material.

5. As a new article of manufacture, a two-part journal-bearing for cars, trucks, and the like, consisting of a wedge or key and a journal-bearing portion, each with a surface designed to interlock with the other, one of which parts—the bearing—is constructed of a material known as leather-board or leatherine.

6. As a new article of manufacture, a two-part journal-bearing for cars, trucks, and the like, one of which parts is constructed of wood, the other, with a surface designed to interlock each with the other, with distended inclosing-wings, all substantially as described, and for the purpose set forth.

GEO. W. SMITH.

Witnesses:
WILLIAM SMASHEY,
HENRY A. LACEY.